Aug. 15, 1933.  J. SCHMIDT  1,922,783
PUMPKIN STEAMER
Filed Sept. 15, 1927  9 Sheets-Sheet 1
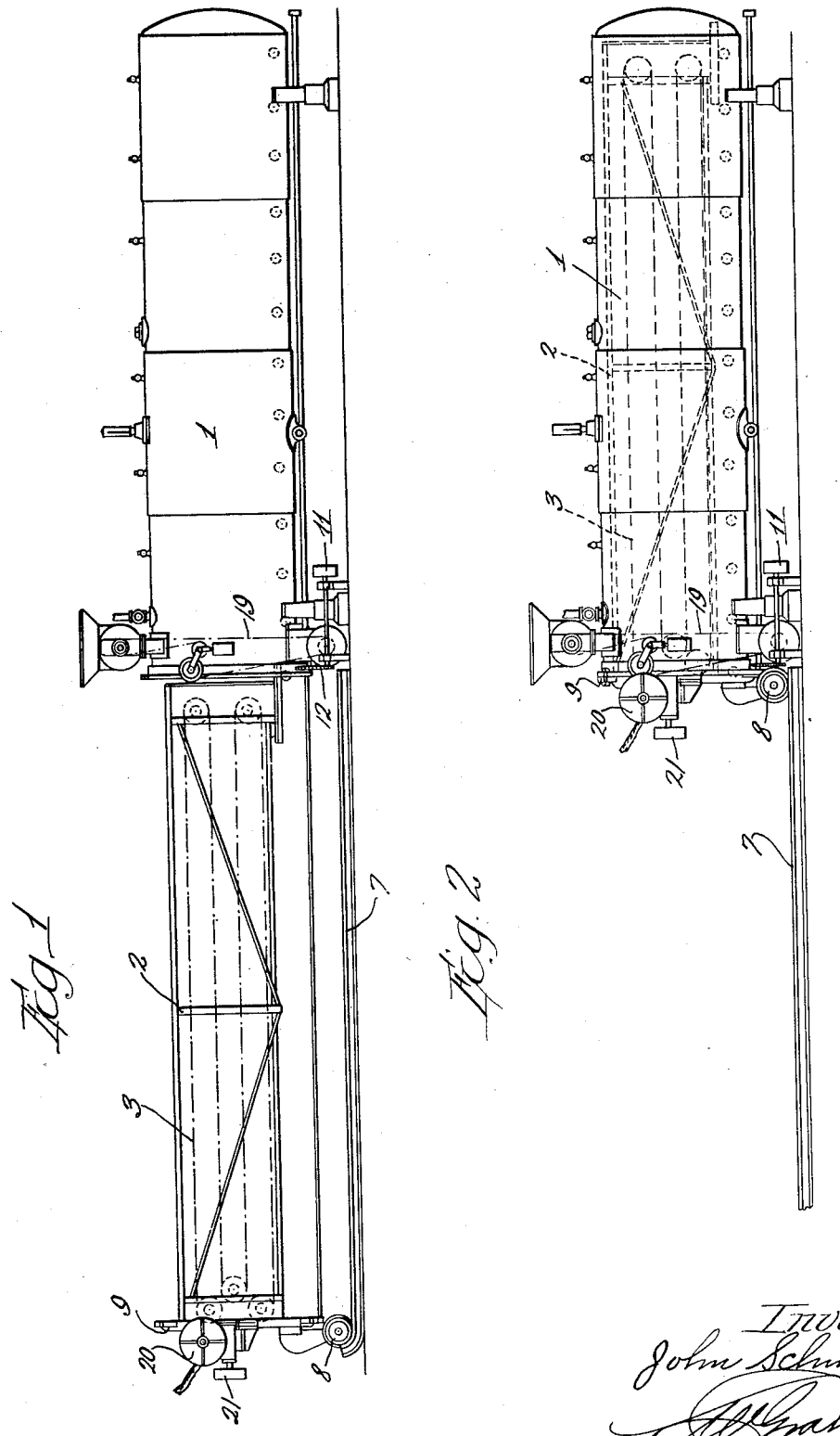
Inventor
John Schmidt

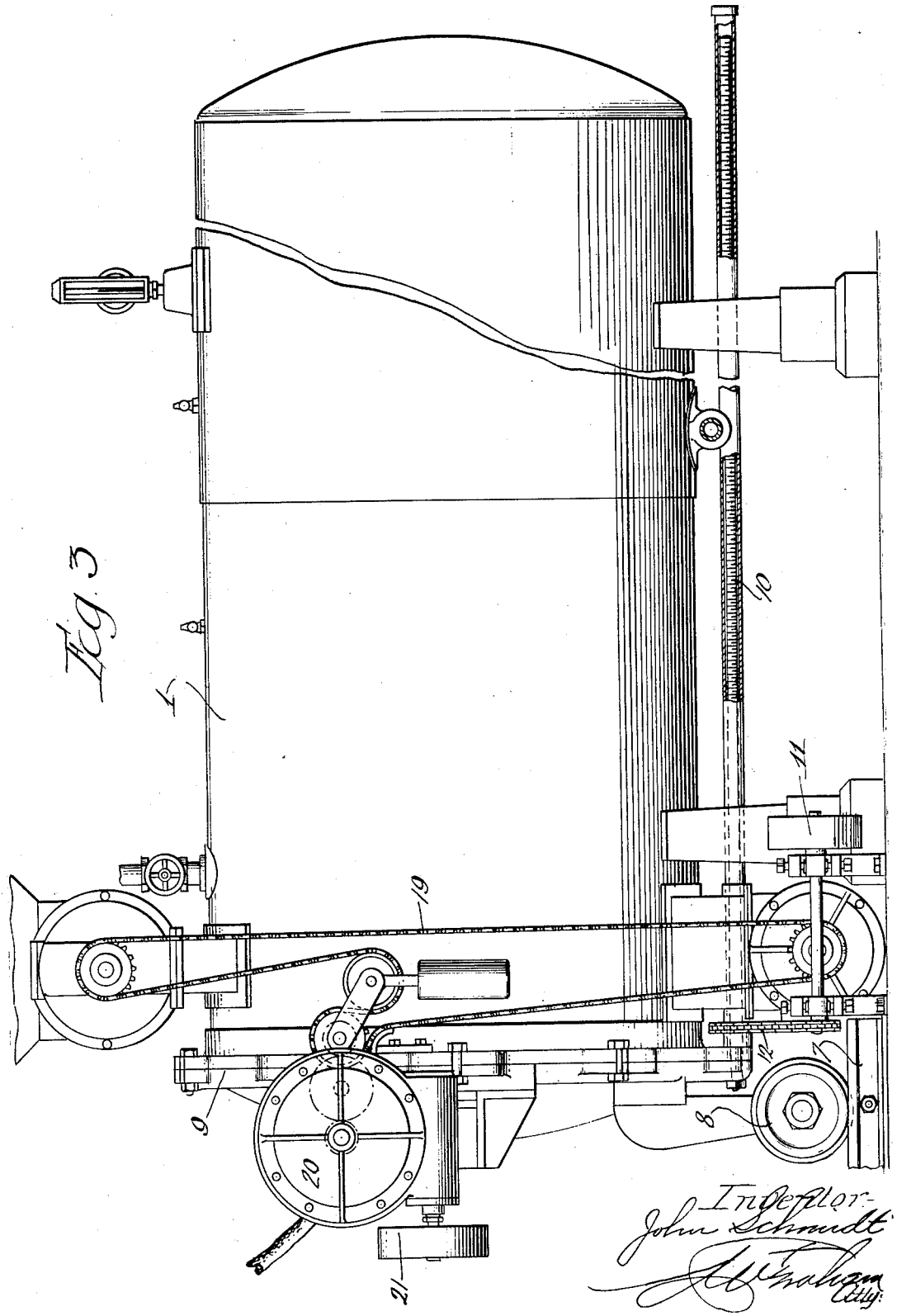

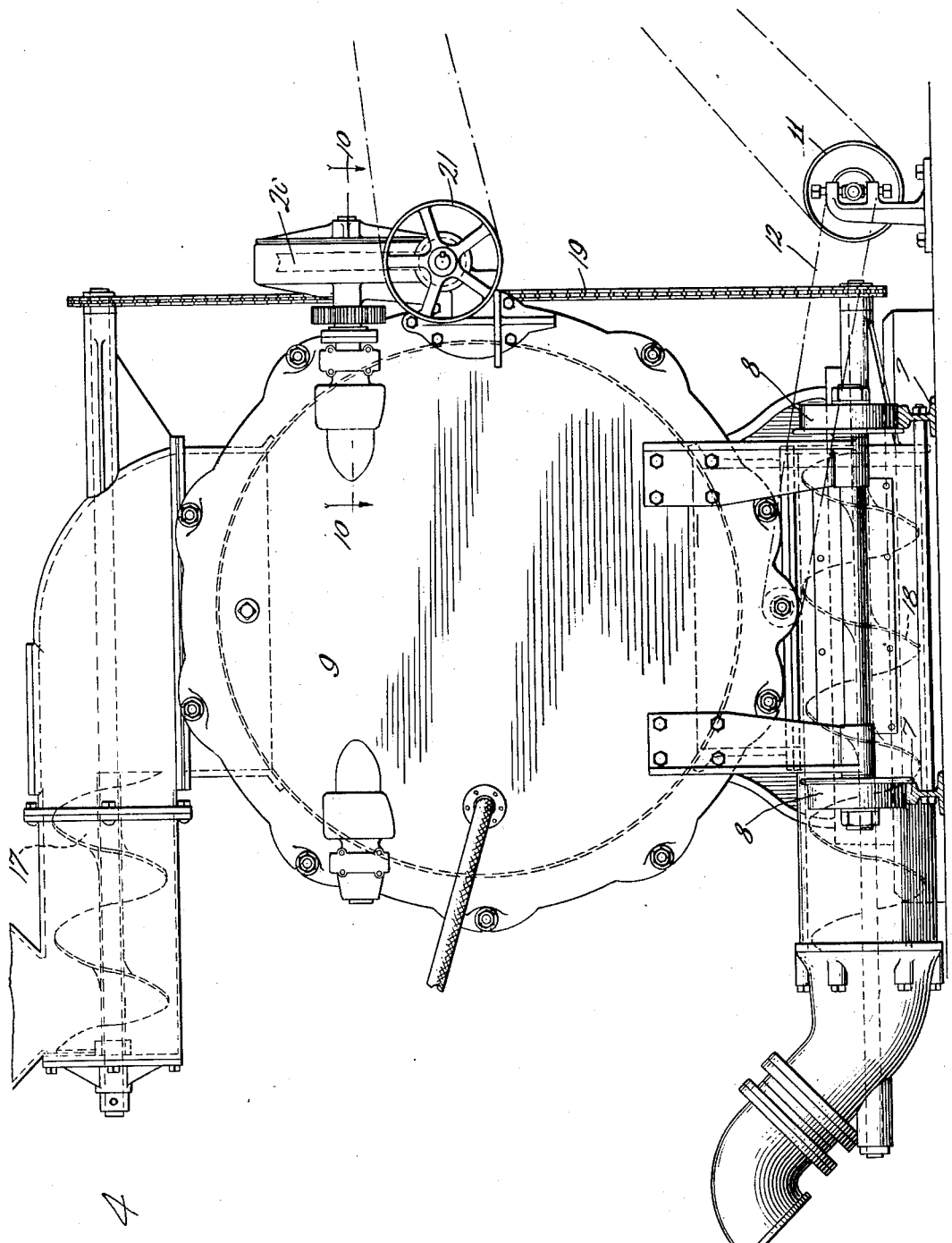

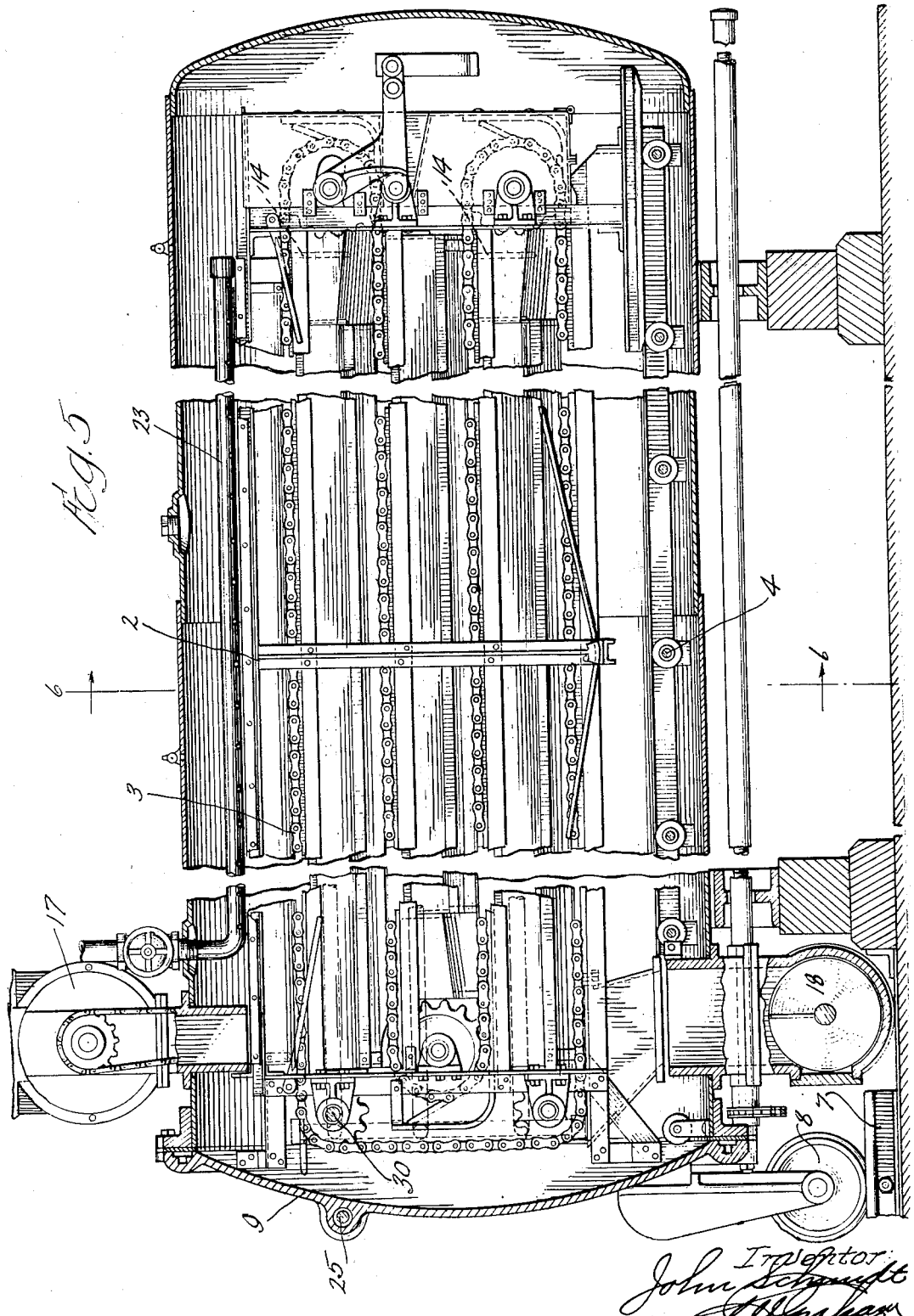

Aug. 15, 1933.  J. SCHMIDT  1,922,783
PUMPKIN STEAMER
Filed Sept. 15, 1927  9 Sheets-Sheet 5

Aug. 15, 1933.  J. SCHMIDT  1,922,783
PUMPKIN STEAMER
Filed Sept. 15, 1927   9 Sheets-Sheet 6

Aug. 15, 1933.    J. SCHMIDT    1,922,783
PUMPKIN STEAMER
Filed Sept. 15, 1927    9 Sheets-Sheet 7

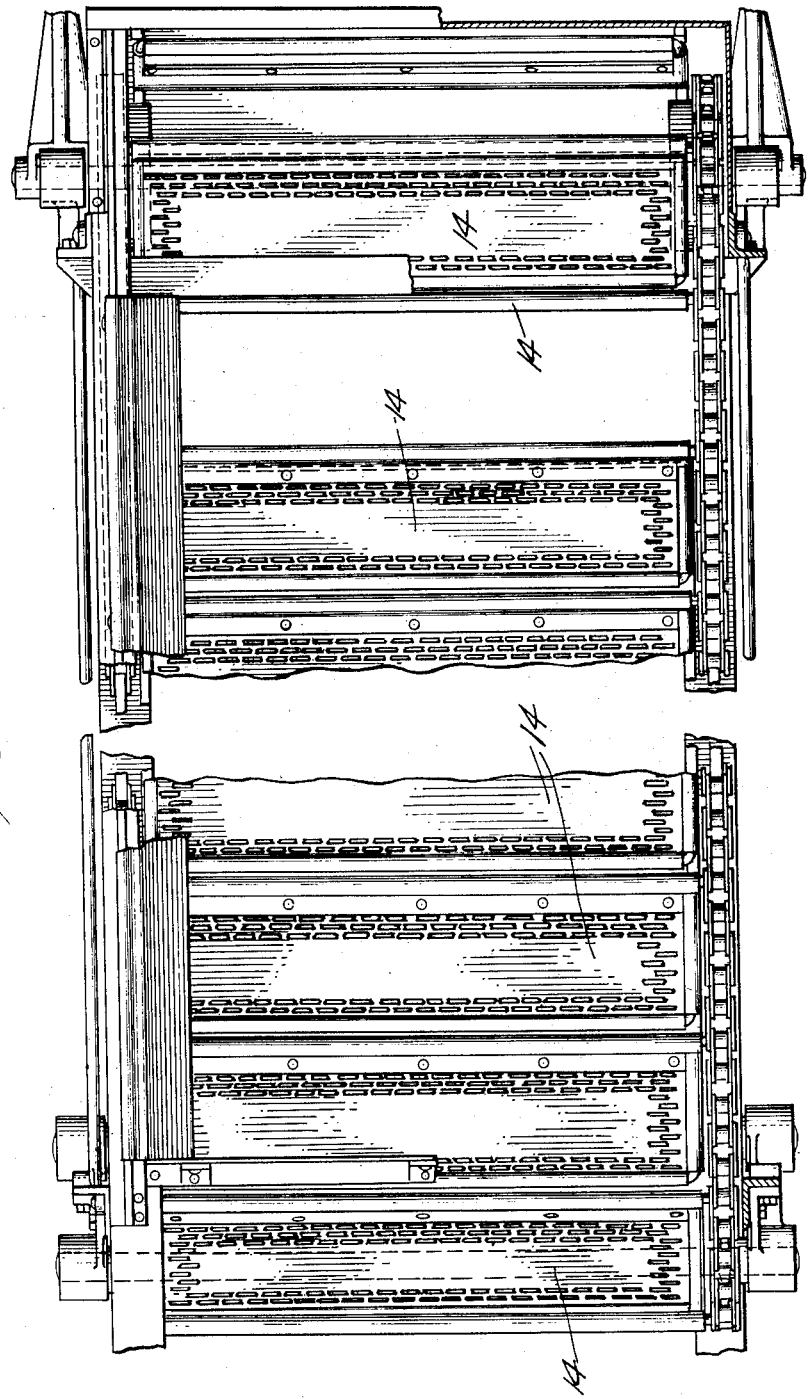

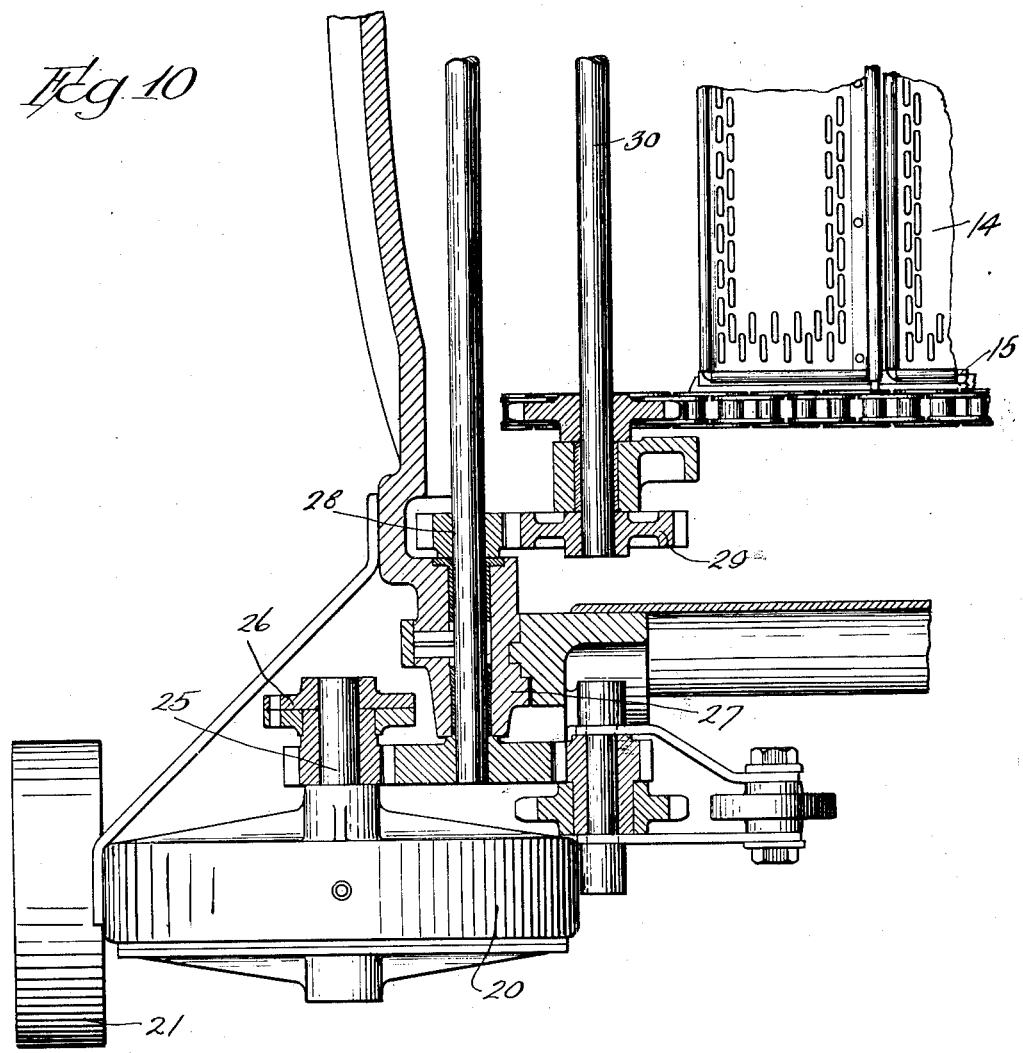

Patented Aug. 15, 1933

1,922,783

UNITED STATES PATENT OFFICE 1,922,783

PUMPKIN STEAMER

John Schmidt, Hoopeston, Ill., assignor to Sprague-Sells Corporation, Hoopeston, Ill.

Application September 15, 1927
Serial No. 219,691

10 Claims. (Cl. 99—2)

This invention relates to a machine and method for treating vegetable products for canning purposes and it is particularly adapted to the treatment of such vegetable products as pumpkin and squash.

In the commercial canning of pumpkin, squash and like products it is the desire of the canner to so prepare the product that it will go into the can with as much of its natural flavor and consistency as is practical with the proper treatments to preserve it. The pretreatment to which this invention relates is what is generally known as steaming or wilting. The principal object of the steaming or wilting operation is to soften the material just sufficiently to permit of pressing the excess moisture out of the pulp so as to produce a comparatively dry product for the can. This steaming operation should not be sufficient to break down the cell structure to permit too much of the moisture and flavor to escape while it is being steamed. The moisture should be removed after the steaming and by means of a suitable press for the purpose. If the steaming is carried to excess the material is broken up and becomes mushy and loses its fibrous texture, and the excess heat to produce this condition releases the liquids and flavors which escape with the condensing steam.

A brief description of the present methods and machines for pretreating pumpkin, squash and like materials and the undesirable results obtained through their use will help materially in understanding and appreciating the merits of this invention.

There are two general classes of machines and methods in use at the present time.

One comprises a tank of suitable size for the requirements of the cannery, having a perforated steam coil located adjacent its bottom. The material to be treated is cut up into suitably sized chunks and as large a quantity of this cut material is placed in the tank on top of the steam coil, as can be treated successfully in one batch. Steam is then admitted to the coil which escapes through the perforation and percolates up through the mass of cut material, gradually heating it to soften or wilt the individual pieces so they will be soft enough to permit pressing the excess moisture therefrom to produce a comparatively dry product for the can.

In this method of treatment the material lying next to the steam coil receives the first heat and that lying at the top of the mass does not receive any heat until the lower part of the mass is partly treated, so that by the time the top of the mass is sufficiently heated that nearest the steam coil is much overtreated and has become soft and mushy, losing much of its moisture and natural flavor which flow away with the condensing steam and are thereby lost. It is also almost impossible to press this oversteamed material on account of its softness and the consequent destruction of its fibrous character which permits it to flow under the pressure with the result that it is never as dry as the more solid material after its final treatment for the can.

The less the breaking down of the fibrous character of the material during the steaming or wilting operation the better and more uniform the final product that goes into the can and the higher price the canner receives for the product. It has been impossible with the method just described to produce a uniformly consistent product on account of the presence of an indeterminate quantity of over steamed material from which the excess moisture cannot be removed by the methods at hand.

The second machine and method for treating material of the nature under discussion comprises an elongated tank or trough open at both ends and having a conveyor moving therethrough to carry the material into and out of the steaming zone. There are two prime objections to this method, first, in order to provide a machine of large enough capacity to care for a moderately sized cannery would utilize more floor space than is usually available in canneries, and second, the two open ends of the tank permit so much steam to escape into the workroom that it is very objectionable. The final product produced by this method was much superior to that coming from the steam tank previously described, since the cut material was carried through the steam zone in fairly uniform layers so that the steaming was much more uniform and there was much less of the product oversteamed. The limitation as to capacity and the objectionable escape of steam into the workroom has made this machine undesirable.

My improved machine and method comprises broadly a completely enclosed chamber in which the material is treated; a substantially steam tight entrance and exit for the passage of material; an endless overlapping conveyor to give a long time of treatment; means operating in connection with the conveyor for turning the material during its transit so that all parts of the mass of material is subjected to the steam treatment in substantially the same manner and order; having feed and discharge means that utilizes the material being treated and handled to seal the entrance and exit openings; having a feed device that distributes a uniform layer of cut material on the conveyor in a continuous stream and a discharge device that works in unison with the feed device so that the treated material is removed with the same uniformity; means whereby the material is transferred from one side of the conveyor to the other so that each flight of the conveyor is utilized; having semi-closed compartments in the steaming chamber and each compartment provided with steaming means permits a more uniform application with the minimum of condensation; means for mounting the entire conveying system on a removable unit for quick and easy inspection or repairs and means for driving and operating the component units in synchronism.

It is therefore a principal object of the invention to provide a machine for steaming products of the nature described having a substantially enclosed treating chamber so that a slight pressure may be maintained with the consequent increase of temperature and economy of operation.

It is also an object of the invention to provide means for feeding material to the steaming chamber and for removing the treated material therefrom which will be substantially steam tight but which will be made practically steam tight by the impacting of the moving material against the sides of the entrance and exit walls.

It is also an object of the invention to provide an endless conveying system for moving the material through the apparatus in a zig zag course so that the steaming space is used to the maximum thereby giving large capacity to the machine.

It is also an object of the invention to provide means operating in connection with the conveying system for periodically turning the mass of moving material on the conveyor so that all parts of the mass will be subjected to the steaming action in a substantially uniform manner and none of the material will be oversteamed.

It is also an object of the invention to provide a feeding device that will deliver a uniform stream of cut material, spread and evenly distributed over the moving conveyor so that the material is deposited throughout its passage in a layer of substantially uniform thickness and in a continuously moving stream.

It is also an object of the invention to provide means operating in conjunction with the conveying means for transferring the moving material from one side of the conveying means to the other side of the conveying means at predetermined intervals so that the conveyor will be carrying material in both directions during its zig zag travel through the steaming chamber.

It is also an object of the invention to provide semi-enclosed steaming compartments in the steaming chamber and to provide a steam supply to each compartment whereby the maximum efficiency is obtained in the application of the steam to the moving material.

It is also an object of the invention to provide independent means with each steaming compartment for collecting and conveying away the condensation and liquids escaping from the material during treatment.

It is also a principal object of the invention to mount all of the conveying, feeding, discharge and operative mechanism on a removable unit for easy removal from the steaming chamber for quick inspection or repairs and for more thorough cleaning after cessation of operation.

It is also an object of my invention to provide a method of handling material of the nature described in a manner to obviate the difficulties and loss due to overtreating portions of a mass of material as has been the trouble encountered with previous methods of handling and application of the treating medium, and to so handle the material during the treating period so that all parts of a moving mass of material will be equally subjected to the treating medium and the treatment thereby performed in the minimum time and with the minimum expenditure of treating medium.

With such objects in view as well as other advantages inherent in the invention, the novel structural peculiarities, novel organization of elements and the separate and collective operations involved in the carrying out of the recited objects which will be made the subject matter of claims hereto appended, I wish to point out that the same may be varied in their proportions, placement, general arrangement and operative relation without departing from the nature and scope of the invention. In carrying out the invention in a concrete form or machine, other objects, advantages and improvements have been evolved, and in order to make the invention more clearly understood there are shown in the accompanying drawings means and mechanism embodying the preferred structural arrangement, and the preferred disposition of the different parts and combinations, in which I have simply shown one way of applying the creative part or concept of the invention which may be applied to other structures and some of the parts or combinations of parts may be used without the others in different types of such machines without departure from the purview of my invention and I regard myself as entitled to such variations from the shown and described devices as fall within the scope and meaning of the claims hereto appended.

In referring to the accompanying drawings which will give a clearer understanding of the invention I wish to point out that the several views constituting the drawings are more or less diagrammatic in character; are not necessarily drawn to scale, nor do they necessarily represent the best or the preferred engineering practices in the construction of machines of this character, and that some of the parts may be shown exaggerated relative to other parts to more clearly disclose and define the invention.

Figure 1 is a side elevation of an apparatus embodying my invention with the operative unit removed from the treating chamber for inspection or repairs. This view clearly shows the relative positions of the various parts of the apparatus when the unit is thus removed, it shows the track work for supporting the unit when so removed and the location of the feed and discharge means relative to the removable unit.

Figure 2 is a companion view to Figure 1 but shows the operative unit replaced in the chamber where it is indicated by dotted lines.

Figure 3 is an enlarged view similar to Figure 2 showing principally the mechanism end of the apparatus; the driving means for the conveyor; the driving means for the feed and discharge devices; the means for automatically drawing the unit out of the chamber and other parts of the mechanism.

Figure 4 is an end elevation looking from the left of Figure 2, this is also an enlarged view and shows the relative locations of the driving means; the feed and discharge means and the means for driving the conveyor system.

Figure 5 is an enlarged side elevation with the casing of the treating chamber in section to show the general arrangement and disposition of the internal operative elements.

Figure 6 is a sectional elevation taken on approximately the line 6—6 of Figure 5. This view shows the arrangement of the steam coils and pipes; the draining pans for conveying away the condensation and other liquids; the track support for the removable unit and other details that will be referred to.

Figure 7:
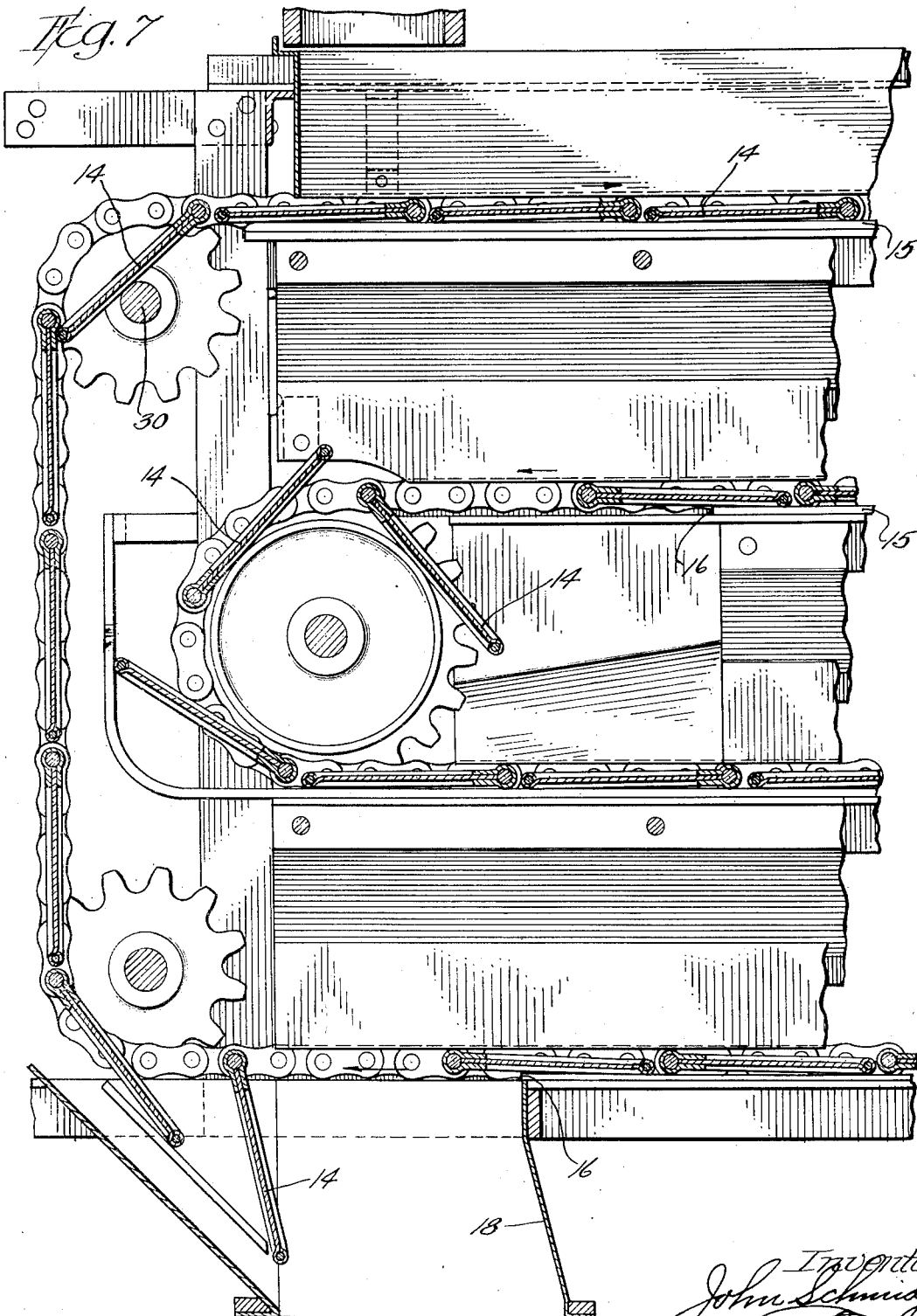

Figure 7 is a sectional elevation of the left end of the machine of Figure 5 and may constitute that portion at the right of the broken line. This section is intended to clearly show the swinging flights forming the conveyor system and the manner of operating them to transfer the material from one section of the conveyor to a lower section and thereby turn the material during transit to present all parts of the mass to the treating medium.

Figure 8:
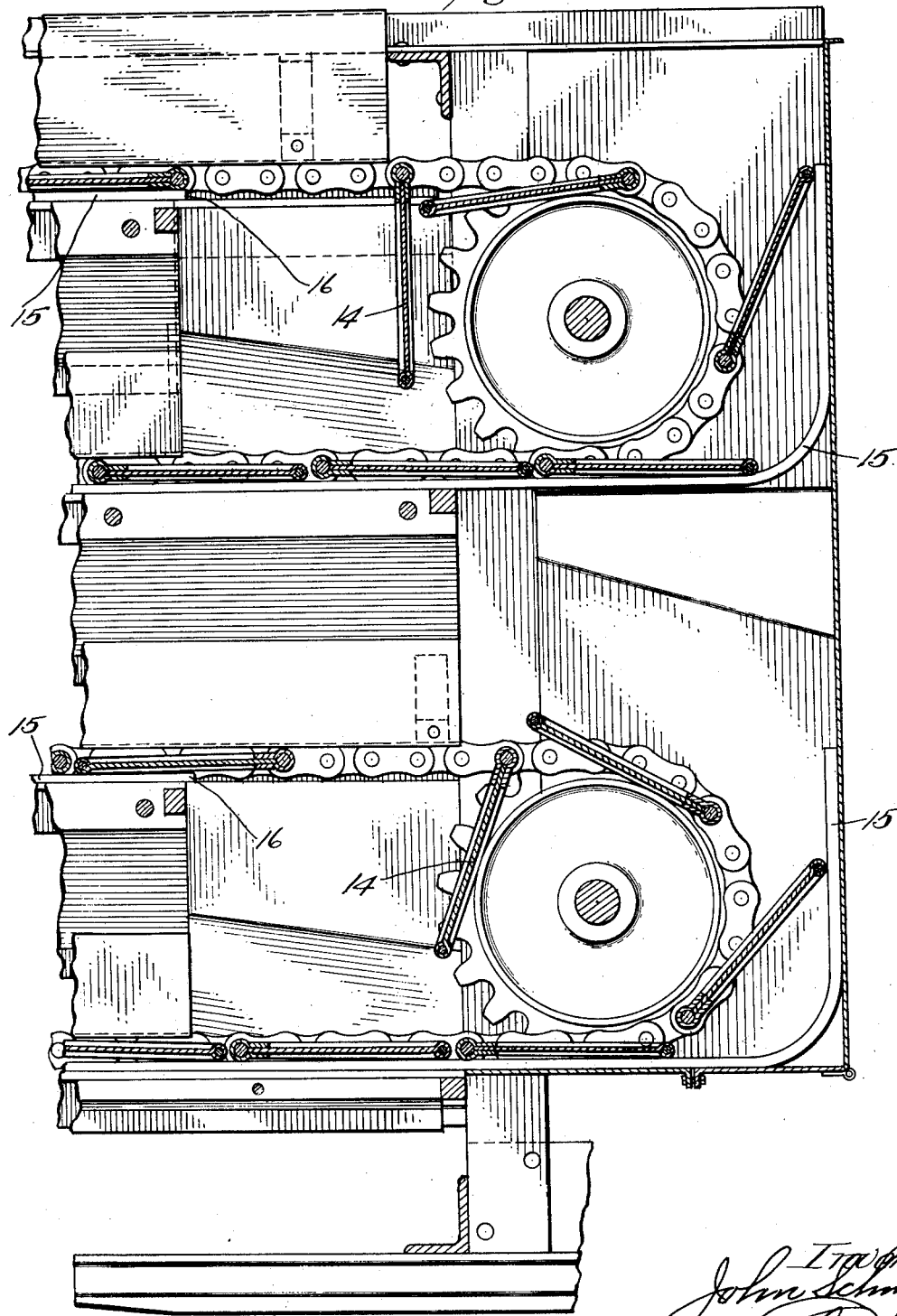

Figure 8 is a similar view of the right end of the machine of Figure 5 which also clearly shows the operation of the swinging flights for the transfer at this end of the machine.

Figure 6:
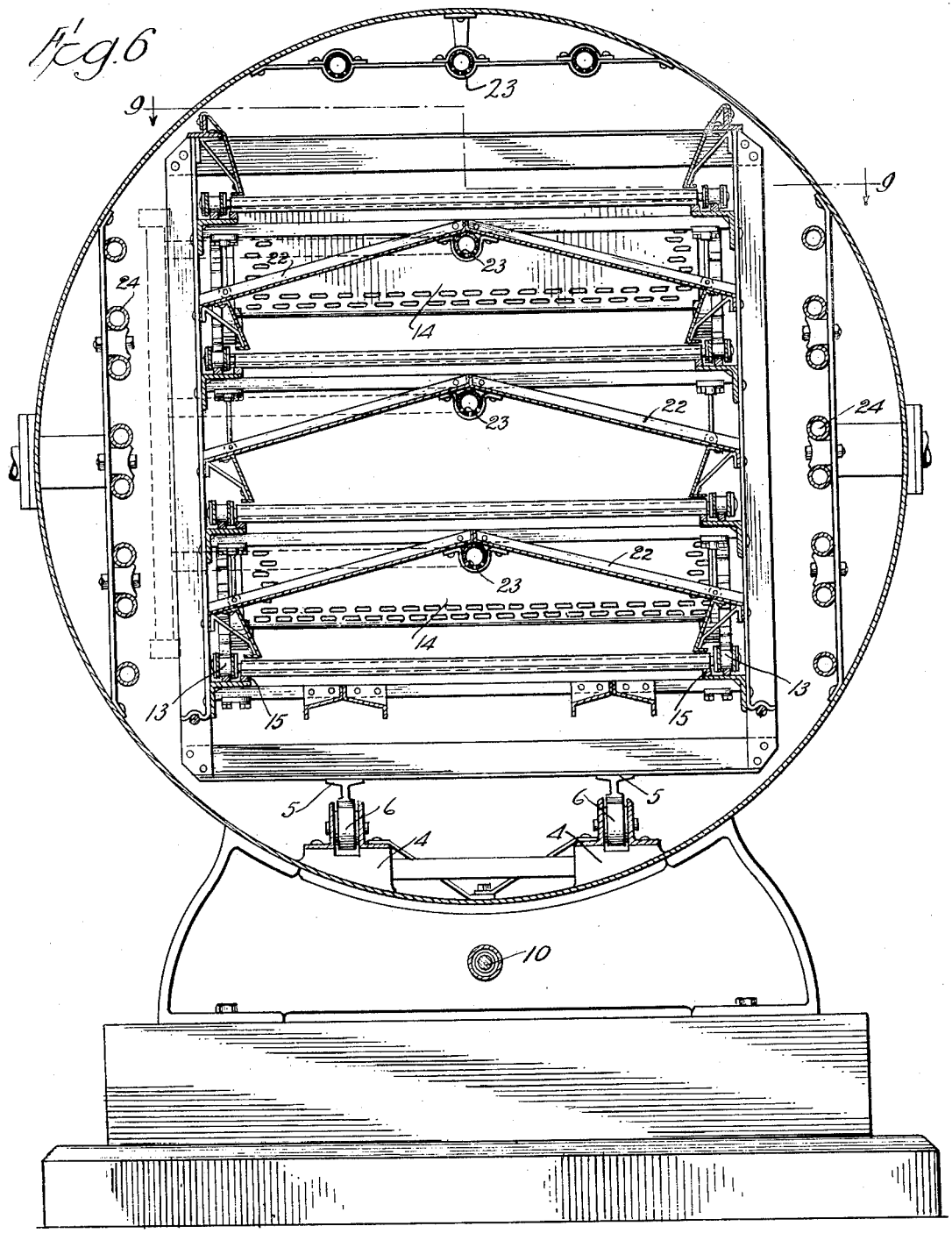

Figure 9 is a sectional plan taken on approximately the line 9—9 of Figure 6.

Figure 10 is a sectional plan of the power section of the machine and is intended to clearly show how power is conveyed to the endless conveyor and is taken on approximately the line 10—10 of Fig. 4.

Referring now to the drawings the numeral 1 indicates the treating chamber or casing which contains the main operating and treating mechanism. 2 indicates broadly the removable unit that carries the conveying mechanism. Fig. 1 shows this unit mechanism removed from the treating chamber for inspection and cleansing after the day's run. One end of the treating chamber is sealed in the manufacture, the other end, through which the removable unit is brought out is closed during operation with a clamped on head carried by the movable unit. This structure is more clearly shown in Figs. 3, 4 and 5. The unit structure carrying the conveying mechanism 3 comprising the zig zag endless chain, normally rests on a track structure located in the bottom of the chamber 1 and indicated by the numeral 4. This track structure comprises rails 5 secured to the under side of the unit structure and resting on rollers 6. Track rails 7 and rollers 8 provide suitable support for the removable unit when it is brought out of the chamber 1. The head 9 for closing the open end of the chamber 1 is carried by the removable unit 2. The means for automatically removing the unit 2 comprises a screw 10 operating through a suitably located nut in the forward end of the casing. This screw 10 is driven by means of the pulley 11 and chain 12. The pulley 11 receives power from a separate source since it is only utilized after the operation of the machine is finished for the day, or on special occasions when it may be necessary to remove the unit during operation for inspection or repairs.

The endless zig zag conveyor 3 comprises two endless chains 13 carried on suitable sprockets and mounted to travel through a to and fro zig zag path with the spacing members 14 pivoted at intervals to provide a wide flat support for holding and carrying the material to be treated. The members 14 are perforated to permit moisture to drip through and the steam to penetrate to the under side of the layer of material. On either side of the conveyor mechanism just inside of the chains 13 are narrow tracks 15 on which the ends of the members 14 ride during their travel with the chain 13. These tracks 15 are cut away at each end of the conveying system just before the chain passes over the sprocket for the return journey as indicated at 16. As each pivoted member slides off the ends of the tracks 15 it drops and discharges the material resting thereon down onto the section of the endless conveyor just below and moving in the opposite direction. This is clearly shown in Figs. 7 and 8. This dropping of the material from one section of the conveyor to another section tends to stir the material and bring hidden portions to the surface to more readily receive the steam treatment. A number of changes from one section of the conveyor to another section during the travel of the material through the entire machine brings all portions of the material to the surface for direct contact with the treating medium. The material, such as pumpkin or squash is cut into suitably sized pieces and fed into the machine through the screw feed device indicated by the numeral 17 Fig. 4, and the treated material is discharged from the machine by a similar device indicated by numeral 18.

The feed and discharge devices 17 and 18 are driven by means of the chain which in turn is driven from the worm gear mechanism and train of gears indicated generally by the numeral 20, power being applied through the pulley 21. Both the feed and discharge devices tend to crowd the material into the cylinder in which the screws rotate and it thereby acts as a seal to prevent undue escape of steam from these openings, so that the treatment progresses in practically a steam tight compartment, and it is practically steam tight when just a slight pressure is carried.

Under each horizontal portion of the zig zag conveyor are arranged inclined drip pans 22, shown best in Fig. 6. These pans will catch and drain away all drippings due to condensed steam or juices coming from the material. Under each drip pan is located a steam pipe 23 that is perforated and projecting steam at all times during operation, so that live steam reaches each section of the conveyor and quickly and uniformly heats and treats the material on the conveyor. On opposite sides of the treating chamber are arranged closed steam pipes for maintaining a uniform temperature within the treating chamber, these are indicated by the numeral 24. Pipes 23 are also located in the top of the chamber as indicated.

Power for driving the zig zag chain is carried through the worm wheel shaft 25 and gears 26, 27, 28 and 29, gear 29 being mounted on the end of the conveyor shaft 30. All of this driving mechanism is carried by the head 9 so that there are no power connections broken when the unit 2 is removed from the treating chamber 1.

*Operation*

Pumpkin, squash or like material to be treated by this machine is preliminarily prepared by washing and roughly cutting it into chunks by means of any of the machines provided for this purpose. These cut pieces are of a size that will permit the steam to easily penetrate and cause a softening or wilting to take place which prepares the product for the succeeding operation of pressing to remove the bulk of the natural moisture contained in the material, which seems a desirable condition in which to can the product. These cut pieces are fed into the mouth of the feed device 17 in any suitable manner, wherein the screw gradually moves them along the cylindrical channel leading into the machine and deposits them in a continuous stream onto the moving conveyor 3. It will be observed that the discharge from this feed device is of substantially the width of the conveyor so that the stream of material is deposited in a comparatively thin layer of substantially uniform thickness and width so that the material being treated will all receive about the same treatment during any portion of its passage through the machine. The conveyor is made up of two side chains suitably mounted on a removable unitary structure to travel in a zig zag path through the machine wherein each return of the conveyor is spaced directly under the path just traversed, thus each path is in superposed relation. The supporting portion of the conveyor is made up of a series of hinged flaps or plates 14 pivoted to the chains, they extend from one chain to the other and form a wide continuous substantially flat surface on which the material is deposited by the screw feed device. The hinged plates are held in their supporting position by means of side tracks 15 on which they slide as they are carried along by the chains. The tracks 15 are just inside the path of the chains. At the discharge end of each flight of the conveyor the tracks 15 are cut away so that the hinged plates can drop, as is well disclosed in Figs. 7 and 8, this sudden drop dumps the material carried by the plate to the plates underneath that have rounded the sprockets and again assumed a flat position and are traveling in the opposite direction. This dumping of the material is accomplished three times in the machine of the application and is sufficient for ordinary practices. More or less runs of the conveyor may be provided in the construction to suit any condition desired. This dumping of the material in this manner tends to mix it thoroughly during its travel through the machine and brings all particles of the mass into contact with the steam which is usually the treating medium, so that each cut piece will have received just the necessary treatment to render it soft and sufficiently wilted to permit the moisture to be properly extracted in the following pressing operation. The sprockets carrying the chains are provided with drum extensions over which the plates 14 ride as they gradually assume their normal positions on the under flight. The tracks 15 are also extended up the side of the casing to assist in righting the plates and bringing them to their normal positions as the chains move forward.

The last dumping takes place in Fig. 7 where the fully treated material is dumped into the discharge chute 18 and from there carried to the pressing machine.

An important feature of this machine and one that contributes quite materially to its success resides in the manner of mounting the entire operative mechanism on a removable unitary structure, with suitable automatic means for removing the operative elements from the enclosed treating chamber for inspection or cleaning. Scrupulous cleanliness is highly important in a machine of this character, and live hot steam projected on all of the operative elements and the inside of the treating chamber is about the only means available for effecting this daily cleaning, and by removing this unit complete all of the operating parts can be efficiently cleaned and the treating chamber as well, and it can be done in the minimum of time and expense.

The power means for operating the various elements of this device being carried by the sealing head it is well here to describe the arrangement and connections that permit the moving of the sealing head and the interior operative unit. Referring to Fig. 10 it will be seen that the entire drive mechanism is permanently mounted on the sealing head 9 and comprises the pulley 21; worm and gear casing 20; main power shaft 25; main drive pinion 26; auxiliary drive shaft 31 and gear 27. Gear 29 carried by shaft 30 meshing with pinion 28. These parts are all permanently mounted on the sealing head and move with it whenever it is moved away from the treating chamber for inspection of the operative mechanism.

The drive means for the feed and discharge mechanism is best seen in Fig. 3 and comprises the chain 19 mounted as shown and driven by means of the gear 27, Fig. 10, meshing with the pinion 32, which pinion 32 is permanently mounted on the stub shaft carrying the sprocket 33 which in turn is secured permanently on the casing of the treating chamber.

When the sealing head 9 is moved out of sealing contact with the chamber the connection between gear 27 and pinion 32 is broken by simply unmeshing the teeth, the gear 27 moving with the head and the pinion 32 remaining with the chamber. When the head is replaced into sealing contact again the gear 27 and pinion 32 mesh without any particular attention when the entire power chain is fully connected for operation.

Various methods of distributing the steam over the material may be used. I have shown pipes over each flight of the conveyor and some in the top of the treating chamber, as well as heating coils along the side of the chamber to maintain a proper temperature inside of the chamber to help along the wilting of the product. The pipes over the flights of the conveyor may be supplied from a header inside the bolted on head carried by the removable unit and would form a part of the operative unit and would move out with the unit when removed, the outer connection being of a flexible nature to permit this movement.

In my description of the various uses to which this invention is applicable I have confined my remarks more or less to the treatment of pumpkin and squash and like materials for canning purposes. I wish to point out here that the invention is adapted to the treatment of many other substances and materials used in the arts and industries. Any material or substance that requires a heat treatment, or that requires manipulation during its preparation for use may be successfully handled by this invention. Among other food products that may be handled by the machine I might mention the preliminary treatment of pie fruit materials and the preliminary baking of beans in the packing of beans. Other uses would be suggested by those familiar with machines and processes adapted to the treatment of food and other products.

Having thus described my invention what I claim as new and desire to secure by Letters Patent is:

1. An apparatus for treating a food product comprising a substantially closed chamber, a sealing head for closing said chamber, a treating mechanism within said chamber, a support within said chamber for one end of said mechanism permitting relative axial movement, means attaching the other end of said mechanism to said sealing head, means without said chamber for supporting said head when removed from sealing contact therewith, power means carried by said head for operating said treating mechanism, automatically disconnectable operating means for driving feed and discharge devices secured to said chamber and operated from the power means carried by said head, feed means and discharge means fixedly connected to said chamber and separate power means for moving said head into and out of sealing engagement with said chamber.

2. An apparatus for treating food products comprising a treating chamber, treating means within said chamber, feed and discharge means connected with said chamber, a sealing head normally closing said chamber, means for moving said head into and out of sealing engagement with said chamber, also for operating said treating means, power means carried by said head for operating said feed and discharge means and automatically disconnectable when said head is moved out of engagement with said chamber and automatically engageable when said head is returned into sealing engagement with said chamber.

3. An apparatus for treating food products comprising a treating chamber, means within said chamber for receiving handling and treating a material, means for delivering a material to said chamber and means for removing treated material from said chamber, a single means for operating said feed and discharge means, power means permanently attached to said treating means within said chamber but disconnectably attached to the means operating said feed and discharge means, a sealing head for said chamber on which said power operating means are attached and to which said treating means within said chamber are attached, means independent of said chamber for supporting said head when out of sealing engagement therewith with power means for moving said head into and out of sealing engagement with said chamber.

4. An apparatus for treating a food product comprising a treating chamber, continuously movable means within said chamber for receiving, handling, and delivering a food material, means for admitting a treating medium into said chamber that is not fixedly connected to said handling means, feed and discharge devices connected to said chamber for feeding to and receiving material from said treating means, means attached to said chamber for operating said feed and discharge means, a sealing head for said chamber, power means carried by said head for operating both said handling and treating means and said feed and discharge means, the connection with said handling means being permanent and the connection with said feed and discharge means being automatically disconnectable, means for moving said head into and out of sealing engagement with said chamber with means for supporting said head when removed away from said chamber.

5. An apparatus for treating a food product comprising a treating chamber, means within said chamber for handling a material by turning it over and over said means comprising an endless conveyor with pivoted members, means for holding said members in planes to support material, wheel supports for said conveyor, means for dumping said material from an upper run of said conveyor to a lower run the dumping taking place between the wheel supports for the conveyor so the material does not pass around the wheel supports, substantially sealed feed and discharge devices for feeding material to said conveyor and moving it away therefrom, a single power means for operating said conveyor and said feed and discharge devices, means for delivering treating medium into said chamber, a sealing head for said chamber to which is attached said power means and said conveyor mechanism, with separate power means for removing said head out of sealing engagement to give access to said conveyor means, and mechanism.

6. An apparatus for treating a product comprising a treating chamber, a sealing head for said chamber movable toward and away from said chamber by axial movement, a material handling and treating means within said chamber, power means carried by said sealing head, feeding and discharge means carried by said chamber, the power means carried by said head being permanently connected to said treating means within said chamber and automatically detachably connected to said feed and discharge means.

7. An apparatus for treating a material comprising a fixed chamber, axially removable treating means disposed in said chamber, a sealing head for said chamber, means attaching said treating means with said sealing head for withdrawal from said chamber, power means carried by said head for operating said treating means, and separate power means for moving said head assembly axially of said chamber, a feeding hopper including a screw conveyor, a chamber enclosing said conveyor and drive means for operating said conveyor, a discharge hopper including a screw conveyor, a chamber enclosing said conveyor and drive means for operating said conveyor, a single drive chain engaging both of said drive means and a single power means for imparting movement to said chain.

8. An apparatus for treating a material comprising a treating chamber, a sealing head for said chamber movable therefrom, a material handling and treating means within said chamber, feeding and discharge means carried by said chamber, power means for operating said material handling and treating means and said feed and discharge means with a disruptable connection between said power means and said feed and discharge means and separate power means for disrupting said connection.

9. An apparatus for treating material comprising a treating chamber, a sealing head for said chamber movable axially relative thereto, a material handling and treating means within said chamber, feeding and discharge means carried by said chamber, power means permanently carried by said sealing head and permanently connected with said material handling and treating means within said chamber, drive means for operating said feed and discharge means, a disruptable connection between said power means and said feed and discharge drive means, automatically disrupted and engaged as said sealing head is moved relative to said treating chamber, separate power means permanently attached to said sealing head for imparting movement thereto relative to said treating chamber.

10. An apparatus for treating a material comprising a treating chamber, a sealing head for said chamber movable axially relative thereto, an endless conveyor for handling and treating material within said chamber, a cage for supporting said conveyor, said cage being permanently attached to said sealing head and movable therewith, power means permanently attached to said sealing head and said endless conveyor, feed and discharge means to move material to and away from said conveyor, detachable power means connecting said feed and discharge means with the power means carried by said sealing head, rotary means connected with said sealing head for moving it axially relative to said chamber and separate power means for operating said rotary means.

JOHN SCHMIDT.